3,284,393
WATER-IN-OIL EMULSION POLYMERIZATION PROCESS FOR POLYMERIZING WATER-SOLUBLE MONOMERS
John W. Vanderhoff and Ralph M. Wiley, Midland, Mich., assignors to The Dow Chemical Company, Midland, Mich., a corporation of Delaware
No Drawing. Filed Nov. 4, 1959, Ser. No. 850,751
8 Claims. (Cl. 260—29.6)

This application is a continuation-in-part of U.S. application Serial No. 662,598, filed May 31, 1957, now abandoned.

This invention concerns a water-in-oil emulsion polymerization process in which a water-soluble monomer is emulsified in an oil phase and polymerized therein.

Conventional emulsion polymerization procedures offer a method for polymerizing water-insoluble (or slightly soluble) monomers to high molecular weight polymers at rapid rates of polymerization. In conventional emulsion polymerization procedures this is achieved by using an oil-in-water emulsifier (usually of the micelle-forming type) to form a large number of monomer particles (about $10^{14}$ per ml.), dispersed in an aqueous phase and a water-soluble initiator to generate free radicals in the aqueous phase (about $10^{13}$ per second per ml.). The free radicals diffuse through the aqueous phase and are captured by the monomer or growing polymer particles. After capture, each free radical initiates a polymer chain in the particle which continues to grow until the entry of a second free radical. When the number of sites of polymerization (polymer particles) is considerable relative to the number of free radicals generated per second, the kinetics will be dependent on the number of these sites. Hence a high molecular weight polymer can be prepared at a rapid polymerization rate.

Water-soluble monomers are conventionally polymerized by mass or solution techniques. Both of these methods have a disadvantage, namely, an inverse relationship between the rate of polymerization and the molecular weight of the resulting polymer.

It has now been discovered that water-soluble monomers and mixtures thereof can be heat polymerized to high molecular weight polymers or copolymers at rapid rates of polymerization using a water-in-oil emulsion polymerization procedure in which one or a plurality of water-soluble monomers, per se or as an aqueous solution, is emulsified in an oil phase by means of a water-in-oil emulsifier and emulsion polymerized under free radical forming conditions to form a polymeric latex in which the oil phase is the dispersion medium.

In accordance with this invention, all known polymerizable water-soluble ethylenic unsaturated monomers the polymers of which are insoluble in the continuous oil phase can be polymerized by a water-in-oil emulsion polymerization process to give a polymeric latex. Such monomers have a water solubility of at least 5 weight percent and include acrylamide, methacrylamide, acrylic acid, methacrylic acid, vinylbenzyl trimethylammonium chloride, alkali metal and ammonium salts of 2-sulfoethylacrylate, ar-sodium styrene sulfonate, 2-aminoethylmethacrylate hydrochloride, alkali metal and ammonium salts of vinylbenzyl sulfonates and the like. When aqueous solutions of the monomers are used, they can be varied widely in monomer content. Proportions between 100 and 5 percent by weight monomer correspondingly to 0 to 95 percent water are used, depending upon the monomer and the temperature of polymerization. The ratio of monomer phase (monomer or aqueous solution of monomer) to oil phase is also widely variable, advantageously between 30 and 70 parts of the former to between 70 and 30 parts of the latter by weight. A monomer phase to oil phase ratio of about 30 to 70 is preferred.

In order to emulsify the monomer phase into the oil phase to give a water-in-oil emulsion, an emulsifying agent of the water-in-oil type is used in amount ranging between 0.1 and 10 percent by weight of the oil phase. Any conventional water-in-oil emulsifying agent can be used, such as hexadecyl sodium phthalate, sorbitan monooleate, sorbitan monostearate, cetyl or stearyl sodium phthalate, metal soaps, and the like. Emulsifying agents having a low hydrophilelyophile balance are preferred. Exemplary emulsifiers are taugh in the literature, e.g., by the Atlas HLB surfactant selector. A simple test suffices to determine whether a given water-in-oil emulsifying agent is adequate for a given water-in-oil system, and whether one water-in-oil emulsifying agent is preferable to another. Obviously, a free radical chain-stopping emulsifying agent would not be used.

The oil phase can be any inert hydrophobic liquid which can readily be separated from the disperse phase polymeric product. Of such liquids, the hydrocarbons and perchloroethylene are advantageous. Aryl hydrocarbons such as toluene and xylene are preferred oil phase liquids.

Free radical yielding initiators useful in polymerizing ethylenic unsaturated monomers, such as benzoyl peroxide, lauroyl peroxide, potassium persulfate and the like are used in the polymerization, advantageously in amounts ranging between 0.002 and 0.2 percent by weight of the oil or monomer phase, depending upon the solubility of the initiator. Polymerization can also be carried out using high energy irradiation, e.g., gamma irradiation from $CO^{60}$, or high energy electrons from a Van de Graaff accelerator, etc., or ultraviolet irradiation.

Elevated reaction temperatures, advantageously between 40° and 70° C., are used with free radical yielding initiators. Within such a temperature range, conversion is substantially complete in from one-half hour to several days, depending upon monomer and reaction variables. High energy or ultraviolet irradiation polymerization is carried out at room temperature or above or below room temperature, as desired.

The reaction is generally carried out at atmospheric or substantially atmospheric pressure. However, superatmospheric pressure is advantageously used when volatile ingredients are involved.

In practice, the water-in-oil emulsifying agent is dissolved in the oil phase, while the free radical initiator, when one is used, is dissolved in the oil or monomer phase, depending upon whether an oil- or water-soluble initiator is used. An aqueous solution of monomer or mixed monomers or monomer per se is then added to the oil phase with agitation until the monomer phase is emulsified in the oil phase, and the reaction is carried out as indicated above. The order of addition of reaction media ingredients is not important. The reaction is continued with agitation until conversion is substantially complete. A polymeric latex is thereby obtained. The polymer is separated from the reaction medium, advantageously by adding a flocculating agent and filtering, and is then washed and dried. Alternatively, the latex reaction product can be used as such.

The following examples show ways in which the invention has been practiced:

EXAMPLE 1.—PREPARATION OF POLYACRYLAMIDE LATEX

*Recipe*

|  | G. |
|---|---|
| Commercial xylene | 175.0 |
| 40 percent acrylamide solution in water | 75.0 |
| Sorbitan monstearate | 17.5 |
| Benzoyl peroxide | 0.04375 |

The acrylamide monomer solution was buffered to pH 5 with sodium acetate and 50 p.p.m. of the sodium salt of ethylenediaminetetraacetic acid was added. The sorbitan monostearate and benzoyl peroxide were dissolved in the xylene and the resulting solution was poured into a glass reactor provided with a thermometer and a stirrer. Monomer solution was then added with stirring. The atmosphere of the reactor was flushed with high purity nitrogen and the reactor was closed. The reaction mixture was heated for 48 hours at 60° C. with agitation. The product was a polymeric latex consisting of water-swollen polymer particles dispersed in xylene. The average particle diameter was about 0.1 micron. A sample of the polymer was recovered by diluting the latex with xylene and flocculating the particles with acetone. The polymer was filtered off, washed with acetone, and dried in a vacuum oven for 4 hours at 35° C. The Brookfield solution viscosity of a 0.5 percent aqueous solution of the polymer, adjusted to pH 3, was 24.6 cps.

EXAMPLE 2.—PREPARATION OF POLYVINYLBENZYL TRIMETHYLAMMONIUM CHLORIDE LATEX

*Recipe*

|  | G. |
|---|---|
| Commercial xylene | 175.0 |
| 48 percent vinylbenzyl trimethylammonium chloride solution in water | 75.0 |
| Sorbitan monostearate | 17.5 |
| Benzoyl peroxide | 0.35 |

The sorbitan monostearate and benzoyl peroxide were dissolved in the xylene and the resulting solution was poured into a glass reactor. The vinylbenzyl trimethylammonium chloride monomer solution was then added. The atmosphere of the reactor was flushed with high purity nitrogen and the reactor was closed. The reaction mixture was heated with agitation for 18 hours at 60° C. The product was a polymeric latex consisting of water-swollen polymer particles dispersed in xylene. A sample of polymer was recovered by diluting the latex with xylene, and flocculating the particles with acetone, filtering and drying in a vacuum oven. The dried polymer when dissolved in water to a concentration of 0.5 percent gave a slightly cloudy solution which had a viscosity of 37.1 cps. This 0.5 percent solution was used to flocculate a 10 percent aqueous suspension of a glacio-lacustrine clay, having the composition indicated in U.S. Patent 2,686,729, issued August 17, 1954.

EXAMPLE 3.—POLYACRYLIC ACID LATEX

*Recipe*

|  | G. |
|---|---|
| Commercial xylene | 175.0 |
| 50 percent acrylic acid solution in water | 75.0 |
| Sorbitan monostearate | 17.5 |
| Benzoyl peroxide | 0.35 |

The sorbitan monostearate and the benzoyl peroxide were dissolved in the xylene and the resulting solution was poured into a glass reactor. Acrylic acid monomer solution was then added. The atmosphere of the reactor was flushed with high purity nitrogen and the reactor was closed. The reaction mixture was heated for 18 hours at 60° C. with agitation. The product was a polymeric latex consisting of water-swollen polymer particles dispersed in xylene. The latex was flocculated with concentrated hydrochloric acid. The polymer after filtering and drying in a vacuum oven, was insoluble in water.

EXAMPLE 4.—POLY(SODIUM 2-SULFOETHYLACRYLATE) LATEX

*Recipe*

|  | G. |
|---|---|
| Commercial xylene | 175.0 |
| 40 percent sodium salt of 2-sulfoethylacrylate | 75.0 |
| Sorbitan monostearate | 17.5 |
| Benzoyl peroxide | 0.35 |

The sorbitan monostearate and the benzoyl peroxide were dissolved in the xylene and the resulting solution was poured into a glass reactor. Sodium 2-sulfoethylacrylate monomer solution was then added. The atmosphere of the reactor was flushed with high purity nitrogen and the reactor was closed. The reaction mixture was heated for 18 hours at 60° C. with agitation. The product was a polymer latex consisting of water-swollen polymer particles dispersed in xylene. A sample of polymer was recovered by diluting the latex with xylene and flocculating the particles with methanol. The polymer was filtered off, washed with methanol and dried in a vacuum oven. The dried polymer, when dissolved in water to the extent of 0.5 weight percent, gave a clear solution having a Brookfield viscosity of 23.1 cps. The 0.5 percent solution was used to flocculate a 10 percent aqueous suspension of glacio-lacustrine clay.

EXAMPLE 5.—POLYACRYLAMIDE LATEX

*Recipe*

|  |  |  |
|---|---|---|
| Commercial xylene | liters | 1.4 |
| 40 percent acrylamide solution in water | g | 600 |
| Sorbitan monostearate | g | 140.0 |
| Benzoyl peroxide | g | 1.4 |

The acrylamide monomer solution was buffered to pH 5 with sodium acetate and 50 p.p.m. of the sodium salt of ethylene diaminetetraacetic acid was then added. The sorbitan monostearate and the benzoyl peroxide were dissolved in the xylene and the resulting solution was poured into the reactor. The acrylamide monomer solution was then added with agitation. The atmosphere of the reactor was flushed with high purity nitrogen. The reaction mixture was heated to 60° C. over a half hour period. The reaction temperature then increased rapidly to 67° C. Heating was discontinued to control the exotherm, and the temperature decreased slowly to 60° C. The temperature was then raised to 62° C. where it remained for the remainder of the reaction, ½ hour. When the temperature began to drop, the nitrogen atmosphere was replaced with ammonia. The ammonia flushing was continued until the temperature reached 50° C. At this point the polymerization was complete. The product was a polymeric latex consisting of water-swollen polymer particles dispersed in xylene. A sample of the polymer was recovered by diluting a portion of the latex with xylene and flocculating the particles with acetone. The polymer was filtered off, washed with acetone, and dried in a vacuum oven at 35° C. for four hours. The Brookfield solution viscosity of a 0.5 percent aqueous solution of the polymer, adjusted to pH 3, was 7 cps.

EXAMPLE 6.—POLYACRYLAMIDE—INITIATOR CONCENTRATION VS. SOLUTION VISCOSITY

The following data summarize the effects of initiator concentration on the solution viscosity of polyacrylamide prepared by inverse emulsion polymerization of a 40 percent acrylamide solution in water, emulsified in xylene. The polymerization temperature was 50° C. All polymerizations were otherwise carried out in the manner previously described in Example 1. In all cases, the latex was flocculated with acetone and the polymer was washed with acetone and dried under vacuum at about 35° C.

| Initiator concn., wt. percent of oil phase: | Soln. visc., cps., 0.5 percent polymer in water, pH 3 |
|---|---|
| 0.025 benzoyl peroxide | 12.8 |
| 0.05 benzoyl peroxide | 11.5 |
| 0.075 benzoyl peroxide | 10.3 |
| 0.10 benzoyl peroxide | 7.74 |
| 0.20 benzoyl peroxide | 7.36 |
| 0.025 benzoyl peroxide+0.025 lauroyl peroxide | 16.2 |
| 0.10 benzoyl peroxide+0.10 lauroyl peroxide | 9.41 |
| 0.10 lauroyl peroxide | 7.0 |
| 0.20 lauroyl peroxide | 6.28 |

The above data indicate that the polymer solution viscosity increases with decreasing initiator concentration. Furthermore, benzoyl peroxide gives a polymer of slightly higher solution viscosity than lauroyl peroxide at the same weight concentration. In addition, the combination of benzoyl and lauroyl peroxides produces a polymer of higher solution viscosity than equal weight concentrations of the separate initiators.

EXAMPLE 7.—POLYACRYAMIDE—OIL PHASE AND INITIATOR CONCENTRATION EFFECTS

The following data summarize the effect of the oil phase at various initiator concentrations in the polymerization of 40 percent acrylamide solution at 60° C. All polymerizations were carried out similarly to the manner previously described in Example 1.

| Oil Phase | Initiator Concn., Wt. Percent of Oil Phase | Soln. Visc., cps., 0.5 Percent Polymer in Water, pH 3 |
|---|---|---|
| Perchloroethylene | 0.1 benzoyl peroxide | 6.16 |
| Do | 0.2 benzoyl peroxide | 3.98 |
| Do | 0.2 lauroyl peroxide | 5.20 |
| Do | 0.2 lauroyl peroxide | 3.87 |
| Xylene | 0.1 benzoyl peroxide | 7.81 |
| Do | 0.2 benzoyl peroxide | 7.36 |
| Do | 0.1 lauroyl peroxide | 7.00 |
| Do | 0.2 lauroyl peroxide | 6.28 |
| Do | 0.1 benzoyl peroxide+ 0.1 lauroyl peroxide. | 9.41 |

The above data indicate that at the same initiator concentration, the polymer solution viscosity is consistently lower when perchloroethylene is the oil phase. For both perchloroethylene and xylene, the polymer solution viscosity increases with decreasing initiator concentration. Also, at the same weight concentration, benzoyl peroxide consistently yields a polymer of higher solution viscosity than lauroyl peroxide. The combination of 0.1 percent benzoyl peroxide and 0.1 percent lauroyl peroxide gives a higher solution viscosity than either 0.2 percent benzoyl peroxide or 0.2 percent lauroyl peroxide separately.

EXAMPLE 8.—POLYACRYLAMIDE—MONOMER CONCENTRATION EFFECT

The following data show the effect of monomer concentration when acrylamide solutions of various concentrations are polymerized at 60° C. similarly to the procedure indicated in Example 1.

| Initiator Concn., Wt. Percent of Oil Phase | Wt. Percent of Monomer | Soln. Visc., cps., 0.5 Percent Polymer in Water, pH 3 |
|---|---|---|
| 0.025 benzoyl peroxide | 40 | 12.8 |
| 0.025 benzoyl peroxide | 30 | 8.3 |
| 0.05 benzoyl peroxide | 40 | 11.5 |
| 0.05 benzoyl peroxide | 30 | 10.2 |

The above data indicate that at the same initiator concentration the polymer solution viscosity increases with increasing monomer concentration.

EXAMPLE 9—POLYMERIZATION TEMPERATURE EFFECT

The following data show the effect of polymerization temperature when a 40 percent acrylamide solution in water is polymerized similarly to the procedure indicated in Example 1, using 0.2 percent benzoyl peroxide as initiator.

| Oil Phase | Polymerization Temp.,° C. | Soln. Visc., cps., 0.5 Percent Polymer in Water, pH 3 |
|---|---|---|
| Perchloroethylene | 50 | 7.54 |
| Do | 60 | 3.98 |
| Xylene | 60 | 7.87 |
| Do | 70 | 5.82 |

The above data indicate that, at the same initiator concentration, the solution viscosity of the polymer increases with decreasing temperature. All of the above runs indicate that the polymer viscosity variations are in qualitative accord with conventional emulsion polymerization theory.

EXAMPLE 10.—POLYVINYLBENZYL TRIMETHYLAMMONIUM CHLORIDE LATEX

*Recipe*

| | |
|---|---|
| Commercial xylene _____l__ | 1.225 |
| 26.6 percent vinylbenzyl trimethylammonium chloride solution in water _____g__ | 525 |
| Hexadecyl hydrogen phthalate _____g__ | 36.75 |
| 5 percent aqueous sodium hydroxide solution _____g__ | 75.38 |
| Lauroyl peroxide _____g__ | 0.0306 |
| Benzoyl peroxide _____g__ | 0.0306 |

The aqueous vinylbenzyl trimethylammonium chloride monomer solution contained 2 percent sodium chloride and 2 percent of the sodium salt of ethylenediaminetetraacetic acid as well as 26.6 percent of monomer. The sodium hydroxide solution, an equivalent amount, was reacted with monohexadecyl phthalate to form the corresponding sodium salt as the emulsifier. The emulsifier was dissolved in the xylene and the resulting solution was added to the reactor. The vinylbenzyl trimethylammonium chloride monomer solution was then added with agitation and the emulsion was sparged with high purity nitrogen while being heated to 60° C. At this point the initiators, dissolved in 20 g. of xylene withheld from the total xylene, were added. Polymerization was completed in about 45 minutes and the mixture was then cooled. The product was a polymeric latex consisting of water-swollen polymer particles colloidally suspended in xylene. The latex was flocculated with acetone and the polymer was filtered, washed with acetone, and dried under vacuum for 16 hours at 40° C. The dried polymer contained 5.22 percent nitrogen on analysis (79 percent polyvinylbenzyl trimethylammonium chloride). A one percent aqueous solution of this dried polymer was prepared and was diluted with an equal weight of a 4 percent aqueous sodium chloride solution. The resulting solution had a capillary solution viscosity of 3.9 cps. A 0.05 percent aqueous solution of the dried polymer was prepared and compared in flocculating ability with corresponding solutions of two samples of polyvinylbenzyl trimethylammonium chloride prepared by conventional solution polymerization. A quantity of 0.5 ml. of each such solution was added to 100 ml. of a 10 percent suspension of 30:70 illite:silica, illite being a complex hydrous silicate of Al, Fe, Mg and K and the silica being finely powdered, in a 100 ml. graduate. In each case polymer addition amounted to 0.05 lb. per ton of suspended solids. The settling rate was measured as the length of time required for corresponding volumes of the suspensions to be cleared, as summarized in the following table.

| Mls. Cleared | Time to Clear, Seconds | | |
|---|---|---|---|
| | 3.1 cps., comparative polymer | 2.0 cps., comparative polymer | 3.9 cps., polymer of Example 10 |
| 10 | 21 | 21 | 17 |
| 20 | 42 | 42 | 32 |
| 30 | 61 | 63 | 48 |
| 40 | 82 | 86 | 64 |
| 50 | 110 | 115 | 85 |

The above data indicate that the settling rate with the 3.9 cps. polymer of this invention is considerably more rapid than that with 2.0 and 3.1 cps. conventional solution polymers.

EXAMPLE 11.—POLY-2-AMINOETHYLMETHACRYLATE HYDROCHLORIDE LATEX

*Recipe*

| | G. |
|---|---|
| Commercial xylene | 700 |
| 50 percent 2-aminoethylmethacrylate hydrochloride solution in water | 300 |
| Sorbitan monostearate | 70 |
| Benzoyl peroxide | 0.035 |
| Lauroyl peroxide | 0.035 |
| 10 percent aqueous solution of sodium salt of ethylenediaminetetraacetic acid | 0.750 |

The solution of sodium salt of ethylenediaminetetraacetic acid was added to the 2-aminoethylmethacrylate hydrochloride monomer solution and the pH was then adjusted from 5.0 to 2.0 with 2 N hydrochloric acid. The sorbitan monostearate was dissolved in 675 g. of the xylene. Twenty percent of the monomer solution was added to the solution of the sorbitan monostearate in the xylene, and a crude emulsion was prepared therefrom in a Waring Blendor. The resulting crude emulsion was homogenized in a hand-homogenizer, then added to the reactor with agitation. The emulsion was continually sparged with purified nitrogen. The reaction mixture was heated to 60° C. and the catalyst mixture dissolved in 25 g. of xylene was then added. The remaining 80 percent of the monomer solution was incrementally added during the course of the reaction. External heat was required to maintain the reaction temperature at 60° C. during the entire polymerization. The course of the polymerization was followed by adding a sample drop of latex to 10 ml. of acetone every 30 minutes. The amount of precipitated polymer was estimated visually. In four hours the reaction was judged to be substantially complete, and the emulsion was cooled to room temperature. The product was a polymer latex consisting of water-swollen polymer particles colloidally dispersed in xylene. The sample of the polymer was recovered by diluting a latex sample with xylene and flocculating the particles wtih. acetone. The polymer was filtered off, washed with acetone and dried in a vacuum oven for 16 hours at 40° C. The solution viscosity of a 0.5 percent aqueous solution of the polymer containing 2 percent sodium chloride was 19.2 cps. at 25° C.

EXAMPLE 12.—POLYVINYLBENZYL SODIUM SULFONATE LATEX

*Recipe*

| | G. |
|---|---|
| Commercial xylene | 700 |
| 20 percent sodium vinylbenzyl sulfonate solution in water | 300 |
| Sorbitan monostearate | 70 |
| Lauroyl peroxide | 0.07 |
| Benzoyl peroxide | 0.07 |

The monomer was dissolved in water at 90° C., since it has a low solubility at room temperature. The sorbitan monostearate was dissolved in 675 g. of the xylene and added to the reactor. The agitator was then started and high purity nitrogen was bubbled through the reactor contents. When the temperature of the xylene solution reached 90° C., the vinylbenzyl sodium sulfonate monomer solution was added. The reaction temperature was then lowered to 60° C. and the catalyst mixture was then added as a solution in 25 g. of xylene. At intervals, samples were taken and the bromide-bromate titration procedure was used to determine percent conversion. The polymerization was stopped after 10¼ hours and the reaction mixture was cooled. The final conversion was 87.8 percent as determined by titration. The product was a polymeric latex consisting of water-swollen polymer particles dispersed in xylene. A sample of the latex was diluted with xylene and flocculated with acetone. The polymer was then filtered off, washed first with acetone to remove xylene and emulsifier, then with glacial acetic acid to remove the residual monomer and finally with acetone to remove the acetic acid. The polymer was then dried in a vacuum oven at 35° C. for four hours. Its Brookfield viscosity, 0.5 percent aqueous solution in the presence of mixed ion exchange resin to remove electrolytes, was 14 cps.

EXAMPLE 13.—POLYVINYLBENZYL TRIMETHYLAMMONIUM CHLORIDE LATEX

*Recipe*

| | G. |
|---|---|
| Commercial xylene | 175 |
| 26.6 percent vinylbenzyl trimethylammonium chloride solution in water | 75 |
| Cetyl and stearyl hydrogen phthalate mixture | 3.5 |
| NaOH (as a 5 percent aqueous solution) | 0.02177 |
| Lauroyl peroxide | 0.004 |
| Benzoyl peroxide | 0.0044 |

The cetyl and stearyl hydrogen phthalate mixture was reacted with the sodium hydroxide solution to form the emulsifier. The emulsifier was then dissolved in 150 g. of xylene. The vinylbenzyl trimethylammonium chloride monomer solution was then added to the xylene-emulsifier solution in the reactor. The reaction mixture was then purged with high purity nitrogen for 20 minutes. The catalysts were then added as a solution in 25 g. of xylene. The atmosphere in the reactor was then flushed with high purity nitrogen and the reactor was closed. The reaction mixture was heated and agitated for 26 hours at 60° C. The product was a polymeric latex consisting of water-swollen polymer particles dispersed in xylene. A sample of the polymer was recovered by diluting the latex with xylene and flocculating the particles with acetone. The polymer was then filtered off, washed with acetone, and dried in a vacuum oven. The dried polymer was dissolved in a 2 percent salt solution to make a solution containing 0.5 percent polymer. This solution had a viscosity of 5.34 cps.

EXAMPLE 14.—POLYVINYLBENZYL SODIUM SULFONATE LATEX

*Recipe*

| | G. |
|---|---|
| Commercial xylene | 700 |
| 20 percent sodium vinylbenzyl sulfonate solution in water | 300 |
| Sorbitan monostearate | 70 |
| Lauroyl peroxide | 0.07 |
| Benzoyl peroxide | 0.07 |

The sodium vinylbenzyl sulfonate monomer and water were heated to 90° C. to give a 20 percent solution of monomer. The sorbitan monostearate was dissolved in xylene along with the catalyst, and the resulting solution was added to the reactor with agitation. The reactor contents was purged with high purity nitrogen throughout the run. The reactor contents was heated to 90° C. in about 30 minutes and the sodium vinylbenzyl sulfonate monomer solution was then added. Heat was discontinued and the reactor temperature slowly decreased to 70° C., where it was held for six hours. The reaction mixture was then cooled to room temperature. The product was a polymeric latex consisting of water-swollen polymer particles dispersed in xylene. A sample of the polymer was recovered by diluting a latex sample with xylene and flocculating the polymer particles with acetone. The polymer was filtered off, washed with acetone, then with glacial acetic acid and again with acetone. The polymer was then dried in a vacuum oven at 35° C. for 4 hours. The Brookfield solution viscosity of a 0.5 percent aqueous solution of the polymer in the presence of mixed ion exchange resin to remove electrolytes was 150 cps. The high molecular weight polysulfonate so obtained is useful as a flocculating agent. The ability of this polymeric sulfonate to flocculate a 10 percent suspension of illite-silica was determined as follows: A small amount of the polymeric sodium vinylbenzene sulfonate as a 0.05 percent solution in water was added in three stages to 100 ml. of a 10 percent illite-silica suspension contained in a 100 ml. stoppered graduate to provide a proportion of 0.5 lb. of polymer per ton of suspended solids. The stoppered graduate was inverted after each addition. The times required for the following volumes of suspension to be cleared were recorded.

| Mls. cleared: | Time to clear, seconds |
|---|---|
| 10 | 28 |
| 20 | 50 |
| 30 | 64 |
| 40 | 95 |
| 50 | 123 |

Thus a very small concentration of this high molecular weight polysulfonate rapidly flocculated the 10 percent illite-silica suspension.

EXAMPLE 15.—POLYACRYLAMIDE LATEX

*Recipe*

| | G. |
|---|---|
| Commercial xylene | 1225 |
| 55.8 percent acrylamide solution in water | 525 |
| Cetyl and stearyl hydrogen phthalate mixture | 36.75 |
| Sodium hydroxide as a 5 percent aqueous solution | 0.2286 |
| Benzyl peroxide | 0.1225 |
| Lauroyl peroxide | 0.1225 |

The cetyl and stearyl hydrogen phthalate mixture was reacted with the 5 percent sodium hydroxide solution to form the emulsifier which was then dissolved in xylene. A quantity of 500 p.p.m. of the sodium salt of ethylenediaminetetraacetic acid as a 10 percent aqueous solution was then added to the acrylamide monomer solution and the pH was adjusted to 5.0 with 0.1 N hydrochloric acid. The xylene emulsifier solution was added to 20 percent of the total charge of the monomer solution and stirred vigorously in a Waring Blendor to form a crude emulsion. This emulsion was then homogenized and added to the reactor with agitation, together with the dry catalyst mixture. The emulsion was purged with high purity nitrogen throughout the run. The reactor contents was heated at 60° C. over a 30 minute period. The polymerization began immediately upon reaching 60° C. Heating was discontinued at this point and the temperature rose rapidly to 68° C., then slowly decreased to 62° C. At this point, the incremental addition of the remaining monomer solution was begun. There was a 20 minute lag before the temperature began to rise again. The monomer solution addition was completed in about one hour. The temperature remained at 62° C. for 20 minutes more and then began to decrease. At this point, heat was applied and the temperature was increased to 70° C. for 10 minutes. The reactor was then cooled. The product was a polymeric latex consisting of water-swollen polymer particles dispersed in xylene. A sample of the polymer was recovered by diluting a latex sample with xylene and flocculating the particles with acetone. The polymer was filtered off, washed with acetone, and dried overnight in a vacuum oven at 35° C. The solution viscosity of a 0.5 percent aqueous solution of the polymer, adjusted to pH 3, was 18.6 cps. In the preceding polymerization, a batch of monomer was used which had regularly produced crosslinked polymer when polymerized conventionally in aqueous solution. The inverse emulsion polymerization procedure of this invention, because of its different mechanism and kinetic scheme, produced a soluble high molecular weight polymer instead of an insoluble cross-linked gel.

EXAMPLE 16.—EFFECTS OF OIL PHASE AND INITIATOR TYPE AND CONCENTRATION

A series of 8 twelve oz. citrate polymerization bottles each containing 75 g. of a 40 percent acrylamide solution in water and 17.5 g. of sorbitan monostearate was emulsified in the below-indicated dispersion media according to the procedure indicated in Example 1. The runs differed in the following respects:

| Run No. | 1 | 2 | 3 | 4 | 5 | 6 | 7 | 8 | 9 |
|---|---|---|---|---|---|---|---|---|---|
| Benzoyl peroxide, g. | | 0.175 | | 0.175 | | 0.35 | | 0.35 | 0.175 |
| Lauroyl peroxide, g. | 0.175 | | 0.175 | | 0.350 | | 0.350 | | 0.175 |
| Xylene, g. | | | 175 | 175 | | | 175 | 175 | 175 |
| Perchloroethylene, g. | 175 | 175 | | | 175 | 175 | | | |

A quantity of 50 p.p.m. of the sodium salt of ethylenediaminetetraacetic acid was added to each portion of monomer solution and its pH was buffered to 5.0 with sodium acetate. The sorbitan monostearate was then dissolved in the xylene or perchloroethylene, respectively, along with the indicated catalyst. The citrate bottles were flushed with purified nitrogen and capped. The bottles were polymerized for 16 hours at 60° C. while being tumbled end-over-end. In all cases, the product was a polymeric latex containing water-swollen polymer particles dispersed in xylene or perchloroethylene, respectively. The samples from each run were diluted with xylene or perchloroethylene, depending upon the dispersing medium used, and flocculated with acetone. The polymer was filtered off, washed with acetone, and dried in a vacuum oven for 4 hours at 35° C. Solution viscosities of aqueous solutions containing 0.5 percent of the respective polymers, having a pH of 3.0, were determined as follows:

| Run No. | Oil Phase | Initiator, Wt. Percent of Oil Phase | Visc. cps., 0.5 Percent Polymer in Water, pH 3.0 |
|---|---|---|---|
| 2 | Perchloroethylene | 0.10 benzoyl peroxide. | 6.16 |
| 6 | do | 0.20 benzoyl peroxide. | 3.98 |
| 1 | do | 0.10 lauroyl peroxide. | 5.20 |
| 5 | do | 0.20 lauroyl peroxide. | 3.87 |
| 4 | Xylene | 0.10 benzoyl peroxide. | 7.81 |
| 8 | do | 0.20 benzoyl peroxide. | 7.36 |
| 9 | do | 0.1 benzoyl peroxide plus 0.1 lauroyl peroxide. | 9.41 |
| 3 | do | 0.10 lauroyl peroxide. | 7.00 |
| 7 | do | 0.20 lauroyl peroxide. | 6.28 |

The solution viscosities of the xylene-dispersed products were consistently higher than those of the perchloroethylene-dispersed products. The solution viscosity increased as the initiator concentration decreased. The same weight concentration of benzoyl peroxide gave a higher solution viscosity than lauroyl peroxide. A mixture of benzoyl and lauroyl peroxides gave a higher solution viscosity than equivalent weights of either peroxide alone. The combination of benzoyl and lauroyl peroxides gave a synergistic effect.

EXAMPLE 17.—WATER-SOLUBLE INITIATOR POLYMERIZATION

To a series of four 12-oz. citrate polymerization bottles each containing 175 g. of commercial xylene, 75 g. of a 30 percent aqueous acrylamide solution, 17.5 g. of sorbitan monostearate and 3.0 ml. of 5 percent aqueous potassium persulfate (0.2 percent of aqueous phase), was added the following:

| Run No.: | Additive |
|---|---|
| 1 | 0 (blank). |
| 2 | 0.0035 g. benzoyl peroxide (0.002 percent of oil phase). |
| 3 | 3.0 ml. 5 percent aqueous $Na_2S_2O_5$ (0.2 percent of aqueous phase). |
| 4 | 3.0 ml. 5 percent aqueous $Na_2S_2O_5$ (0.2 percent of aqueous phase) +0.0035 g. benzoyl peroxide (0.002 percent of oil phase). |

In the series, the water-soluble potassium persulfate, and the sodium metabisulfite (Runs 3 and 4), were dissolved in the aqueous monomer solution. In each case aqueous monomer solution was emulsified in the xylene containing dissolved sorbitan monostearate and benzoyl peroxide (Runs 2 and 4) by shaking and by homogenizing with a hand homogenizer. The emulsions were purged with high purity nitrogen and the bottles were capped. Runs 1 and 2 were agitated for 22.5 hours at 60° C. Runs 3 and 4 were agitated for 16 hours at 50°–64° C. In each case the product was a polymeric latex consisting of submicroscopic water-swollen polymer particles colloidally dispersed in xylene. Electron micrographs showed the following particle size ranges for the 4 runs:

| Run 1 | 150–2000 A., predominantly 150–900 A. |
| Run 2 | 150–1500 A., predominantly 150–650 A. |
| Run 3 | 150–2000 A. |
| Run 4 | 150–1300 A. |

The particle size variations between samples of the 4 runs were minor. Since all samples contained particles smaller than emulsion droplets, it is clear that true emulsion polymerization occurred involving particle initiation in emulsified micelles with the monomer droplets serving as monomer reservoirs.

Samples of the latexes were diluted with xylene and flocculated with acetone. The polymer was filtered off, washed with acetone, and dried in vacuo. Their capillary solution viscosities were measured on 0.5 percent aqueous solutions at a pH of 3.0 and found to be as follows:

| | Cps. |
|---|---|
| Run 1 | 5.50 |
| Run 2 | 5.69 |
| Run 3 | 1.55 |
| Run 4 | 1.54 |

Runs 3 and 4 containing sodium metabisulfite gave polymers having the lower solution viscosities. This was expected because of the higher free radical concentration. The small amount of benzoyl peroxide appeared to have little effect on the solution viscosity.

EXAMPLE 18.—HIGH MOLECULAR WEIGHT 80:20 ACRYLAMIDE-VINYLBENZYL TRIMETHYLAMMONIUM CHLORIDE COPOLYMERS

Recipe

| | G. |
|---|---|
| Commercial xylene | 175 |
| 24.6 percent aqueous vinylbenzyl trimethylammonium chloride solution | 15 |
| 24.6 percent aqueous acrylamide solution | 60 |
| Sorbitan monostearate | 17.5 |
| Sodium salt of ethylene diamine tetraacetic acid as a 10 percent aqueous solution (0.20 percent based on monomer solution) | 0.15 |
| Benzoyl peroxide | 0.0018 |
| Lauroyl peroxide | 0.0018 |

Two runs of the above recipe, differing in that in Run 2 the aqueous vinylbenzyl trimethylammonium chloride solution was treated with chloromethylstyrene monomer to react with any amine hydrochloride that might be present as an impurity, were carried out similar to the procedure of Example 1 for a period of 16.5 hours (Run 1) and for 40.5 hours (Run 2). The products were polymeric latexes consisting of water-swollen polymer particles colloidally suspended in xylene. The products were 80:20 acrylamide-vinylbenzyl trimethylammonium chloride copolymers. Copolymer samples were recovered by diluting the latexes with xylene and pouring them into acetone to flocculate the particles. The copolymers were filtered, washed with acetone and dried in vacuo for three hours at 30° C. The capillary solution viscosities (0.5 percent aqueous suspension containing 2 percent sodium chloride) were as follows:

| | Cps. |
|---|---|
| Run 1 | 11.9 |
| Run 2 | 19.0 |

The solution viscosities of these soluble copolymers were noteworthy, since conventional solution polymers range between 5 and 10 cps. in viscosity. They were tested for flocculating ability with an illite-silica suspension with the following results.

30:70 ILLITE-SILICA SUSPENSION, 10 G. SOLIDS/100 ML. SUSPENSION

Loading=0.05 lb. polymer/ton suspended solids.

0.05 percent solution in water of polymers of Runs 1 and 2 added in three increments.

| Mls. Cleared | Time to Clear, Seconds | |
|---|---|---|
| | Run 1 | Run 2 |
| 10 | 11.5 | 12.5 |
| 20 | 21.5 | 25.0 |
| 30 | 31.5 | 39.0 |
| 40 | 42.0 | 56.0 |
| 50 | 55.0 | |
| 60 | | |
| Interface | Good | Good |
| Overhead | Clear | Clear |
| Flocs | Medium | Medium |

EXAMPLE 19.—POLYMETHACRYLIC ACID LATEX FROM WATER FREE EMULSION

Recipe

| | G. |
|---|---|
| Commercial xylene | 225 |
| Glacial methacrylic acid (inhibitor-free) | 25 |
| Sorbitan monostearate | 22.5 |
| Benzoyl peroxide | 0.45 |

The sorbitan monostearate was dissolved in 212 g. of the xylene in a 12-ounce citrate bottle. The glacial methacrylic acid was then added, followed by the benzoyl peroxide dissolved in 13 g. xylene. The bottle was flushed with high purity nitrogen and capped. The sample was polymerized while being agitated for 16 hours at 70° C. The product was a polymeric latex of polymethacrylic acid particles dispersed in xylene. Electron microscope examination showed that the particles were spheroidal and ranged from 0.25 to 1 micron in diameter. One part latex was diluted with 2.2 parts xylene and the resultant dilution was poured into 40 parts acetone to flocculate the latex particles. The coagulated polymer was filtered out and washed with acetone to remove occluded sorbitan monostearate. The polymer was then dried in a vacuo at room temperature. The weight of polymer recovered indicated that the polymerization had proceeded to essential completion. The recovered polymer was soluble in water. The solution viscosity of a 1 percent aqueous solution at 25° C. was 1.31 cps.

weighed. The percent conversion was calculated from these data, and in general the values were slightly lower than those listed in the table, i.e., in reasonable agreement since the precipitation was only semi-quantitative. The dried polymer was dissolved in 0.5 normal NaCl in 0.4 g. polymer/100 ml. solution concentration. All samples were quite transparent. The viscosities of these solutions were determined and the weight average molecular weight was calculated from a determined correlation between light scattering measurements and reduced specific viscosity. The molecular weights, ranging from 18,000 to 80,000, are listed in the table. The effect of $Cu^{+2}$ which

| Run No. | Percent $Bz_2O_2$ | Percent $H_2O$ | P.p.m. Chain Transfer Agent | Percent Conversion | M.W., $\times 10^{-4}$ | Particle Size, E.M. |
|---|---|---|---|---|---|---|
| 1 | 1.0 | 1 | | 60 | 2.2 | 0.02–0.1μ. |
| 2 | 1.0 | 3 | | 75 | 1.8 | ca. 0.02μ, some 1.5μ. |
| 3 | 0.50 | 6 | | 77 | 4.0 | Very small. |
| 4 | 1.0 | 6 | | 86 | 2.0 | 0.02–0.05μ; some up to 4μ. |
| 5 | 0.50 | 3 | 10–$Cu^2$ | 62 | 2.8 | 0.02μ and smaller; some large particles. |
| 6 | 1.0 | 3 | 10–$Cu^2$ | 78 | 2.4 | Very small. |
| 7 | 0.2 | 6 | 10–$Cu^2$ | 84 | 7.0 | 4μ and smaller. |
| 8 | 0.5 | 6 | 10–$Cu^2$ | 83 | 3.2 | Very small. |
| 9 | 1.0 | 6 | 10–$Cu^2$ | 90 | 3.2 | Do. |

EXAMPLE 20.—POLY(SODIUM STYRENE SULFONATE) LATEXES

*Basic recipe*

Total charge _____ 220 g.
Continuous phase _____ Xylene (technical grade).
Monomer phase _____ ar-sodium styrene sulfonate 93.3 percent, balance byproduct inorganic salts.
Monomer/xylene solution __ 0.23.
Xylene solution _____ 10 percent sorbitan monostearate, 0.2–1.0 percent benzoyl peroxide (all based on xylene).
Deionized water _____ 1–6 percent based on monomer.

A series of emulsions within the range of the above basic recipe was prepared and polymerized as indicated below. The variations employed, as well as data on conversion, polymer molecular weight and approximate particle size from electron microscope observation, E.M., are listed in the following table. The sorbitan monostearate and benzoyl peroxide ($Bz_2O_2$) were dissolved in the xylene. The dry, powdery monomer as well as the water (containing $Cu^{+2}$ where applicable) was added and the mixture was agitated for 5 minutes in a Waring Blendor to produce a water-in-oil emulsion. The samples containing 6 percent water were also homogenized in a Cenco Hand Homogenizer. The emulsions were placed in 12-ounce bottles which were then flushed with nitrogen and capped. The bottles were agitated for 23.5 hours at 70° C. and then cooled. The products were fairly stable dispersions quite similar in appearance to the other water-in-oil latexes. A sample of each latex was examined in the electron microscope. In most cases, spherical particles could be observed. The particle sizes ranged from less than 200 A. to several microns. The latexes were flocculated by pouring them into about 3 volumes of acetone. The resulting precipitate in each case was filtered and washed with acetone to remove sorbitan monostearate and xylene and was dried in vacuo for 16 hours at 50° C. The dried samples of polymer plus residual monomer were analyzed for percent unsaturation by a coulometric bromination technique. The data are expressed as percent conversion in the table.

The dried materials (20 g.) were dissolved in 10 percent concentration in water. These solutions were precipitated in 6 volumes of absolute alcohol. Each sample was then filtered and washed with one liter of alcohol. The polymer was left on the filter and the monomer remained in solution. The polymer samples were dried and weighed. The percent conversion was calculated from these data, and in general the values were slightly lower than those listed in the table, i.e., in reasonable agreement since the precipitation was only semi-quantitative. The dried polymer was dissolved in 0.5 normal NaCl in 0.4 g. polymer/100 ml. solution concentration. All samples were quite transparent. The viscosities of these solutions were determined and the weight average molecular weight was calculated from a determined correlation between light scattering measurements and reduced specific viscosity. The molecular weights, ranging from 18,000 to 80,000, are listed in the table. The effect of $Cu^{+2}$ which was added as a potential chain-transfer agent, was to increase the molecular weight slightly. In general, increasing benzoyl peroxide concentration resulted in a decrease in polymer molecular weight.

What is claimed is:

1. A water-in-oil emulsion polymerization method for making latex polymers and copolymers of water-soluble ethylenic unsaturated monomers which method comprises forming a water-in-oil emulsion of the group consisting of a water-soluble ethylenic unsaturated monomer having a water solubility of at least 5 weight percent and aqueous solutions thereof, in an inert hydrophobic liquid organic dispersion medium containing between 0.1 and 10 percent by weight of a water-in-oil emulsifying agent, wherein the proportion of monomer phase ranges between 30 and 70 percent of the emulsion, heating the emulsion under free radical forming conditions to polymerize monomer in a disperse phase in said dispersion medium and recovering the polymerized latex product.

2. The method of claim 1 wherein the monomer is polymerized at temperatures between 40° and 70° C.

3. The method of claim 2 wherein the monomer is acrylamide.

4. The method of claim 2 wherein the monomer is acrylic acid.

5. The method of claim 2 wherein the monomer is 2-sulfoethyl acrylate.

6. The method of claim 2 wherein the monomer is ar-sodium vinylbenzyl sulfonate.

7. The method of claim 2 wherein the monomer is vinylbenzyl trimethylammonium chloride.

8. The method of claim 2 wherein the monomer is ar-sodium styrene sulfonate.

References Cited by the Examiner

UNITED STATES PATENTS

| | | | |
|---|---|---|---|
| 2,471,743 | 5/1949 | Harrison | 260—88.7 |
| 2,566,162 | 8/1951 | Caldwell | 260—89.7 |
| 2,634,257 | 4/1953 | Faragher | 260—95 |
| 2,982,749 | 5/1961 | Friedrich | 260—29.6 |

FOREIGN PATENTS 698,443   10/1953   Great Britain.

JOSEPH L. SCHOFER, *Primary Examiner.*

HAROLD N. BURSTEIN, WILLIAM H. SHORT,
*Examiners.*

R. A. BURROUGHS, J. F. McNALLY, D. K. DENENBERG, *Assistant Examiners.*